United States Patent [19]

Shono

[11] Patent Number: 5,144,352
[45] Date of Patent: Sep. 1, 1992

[54] CONTROL APPARATRUS OF FOCUS AND SHUTTER OF CAMERA

[75] Inventor: Tetsuji Shono, Tokyo, Japan

[73] Assignee: Asahi Kogaku Kogyo Kabushiki Kaisha, Tokyo, Japan

[21] Appl. No.: 508,359

[22] Filed: Apr. 12, 1990

[30] Foreign Application Priority Data

Apr. 14, 1989 [JP] Japan .................................. 1-94789
Apr. 27, 1989 [JP] Japan ................................. 1-108929

[51] Int. Cl.⁵ .......................................... G03B 13/00
[52] U.S. Cl. ................................... 354/400; 354/439; 354/234.1
[58] Field of Search ........ 354/435, 436, 437, 400–409, 354/234.1, 439

[56] References Cited

U.S. PATENT DOCUMENTS

| | | | |
|---|---|---|---|
| 4,360,258 | 11/1982 | Hashimoto | 354/195.1 |
| 4,396,267 | 8/1983 | Hirohata et al. | 354/234.1 |
| 4,456,360 | 6/1984 | Tamura | 354/195.1 |
| 4,506,966 | 3/1985 | Kuge | 354/195.1 |
| 4,696,559 | 9/1987 | Kondo | 354/403 |
| 4,868,596 | 9/1989 | Ishida et al. | 354/400 |
| 4,918,480 | 4/1990 | Hori | 354/400 |

FOREIGN PATENT DOCUMENTS

| | | |
|---|---|---|
| 3126334 | 5/1982 | Fed. Rep. of Germany . |
| 3153207 | 5/1982 | Fed. Rep. of Germany . |
| 3249465 | 12/1986 | Fed. Rep. of Germany . |
| 3829554 | 4/1989 | Fed. Rep. of Germany . |
| 58-27134 | 2/1983 | Japan . |
| 61-9631 | 1/1986 | Japan . |
| 61-255330 | 11/1986 | Japan . |
| 62-26450 | 6/1987 | Japan . |
| 62-220939 | 9/1987 | Japan . |
| 63-19637 | 1/1988 | Japan . |
| 2097138 | 10/1982 | United Kingdom . |
| 2160990 | 1/1986 | United Kingdom . |

OTHER PUBLICATIONS

English Abstract of Japanese Patent 58-27134.
English Abstract of Japanese Patent 61-9631.
English Abstract of Japanese Patent 61-255330.
English Abstract of Japanese Patent 62-220939.
English Abstract of Japanese Patent 63-19637.
English Abstract of Japanese Patent 56-92525.

Primary Examiner—L. T. Hix
Assistant Examiner—David M. Gray
Attorney, Agent, or Firm—Sandler, Greenblum & Bernstein

[57] ABSTRACT

A focus and shutter control apparatus of a camera including an actuating member which is driven by a reversible motor, an automatic focus control mechanism which determines a displacement of a focus adjusting lens in accordance with a displacement of the actuating member in one direction, a shutter control mechanism which determines the opening angle of the shutter mechanism in accordance with a displacement of the actuating member in the other direction, and a shutter biasing mechanism for biasing the shutter mechanism in a direction to open or close the photographing aperture, so that one of the opening and closing operations of the shutter mechanism is effected by the biasing mechanism, the other closing or opening operation being effected by the movement of the actuating member which in turn is moved by the reversible motor.

22 Claims, 10 Drawing Sheets

Fig. 10 the present invention, of which;

CONTROL APPARATUS OF FOCUS AND SHUTTER OF CAMERA

BACKGROUND OF THE INVENTION

1. Field of the Invention

The present invention relates to a control apparatus of a focus control lens and a shutter in a lens shutter type camera having an automatic focusing function (AF function) and an automatic exposure function (AE function).

2. Description of the Related Art

In a camera having a photographing lens which has therein a focus control lens and a lens shutter mechanism, the focus control lens is moved to a focal point by the rotation of a single reversible motor in one direction and the lens shutter, which also serves as a diaphragm, is actuated to open at a predetermined diaphragm value (aperture) for a predetermined period of time by the rotation of the reversible motor in the reverse direction. In the conventional control apparatus, the operational speed of the shutter at which the shutter is opened and closed is determined by the rotational speed of the motor. Since no rotational speed of the motor depends on the direction of rotation thereof, the characteristics of the opening and closing movement of the shutter describe an inverted symmetrical V-shape, an apex of which corresponds to the largest aperture, resulting in a difficulty in a realization of a high speed shutter. One solution thereto is to differentiate the rotational speed of the motor at the forward rotation from that of the reverse rotation. However, there are still many technological problems to be solved which stand in the way of obtaining such a motor. Therefore the development of a high shutter speed is not as rapid as expected.

SUMMARY OF THE INVENTION

The primary object of the present invention is to provide a lens shutter mechanism realizing a high speed shutter which eliminates the problem of the prior art as mentioned above.

According to the basic concept of the present invention, the opening operation or the closing operation of the shutter is effected by the motor, and the other operation. i.e. the closing operation or the opening operation is effected by a spring force to provide a higher shutter speed.

In particular, the opening operation or the closing operation of the shutter, with the help of spring force, can be effected at a higher operational speed than the closing or opening operation thereof by the motor, and accordingly, a higher shutter speed can be obtained as a whole.

According to an aspect of the present invention, there is provided a focus and shutter control apparatus of a camera comprising an actuating member which is driven by a reversible motor, an automatic focus control mechanism which determines a displacement of a focus adjusting lens in accordance with a displacement of the actuating member in one direction, a shutter control mechanism which determines the opening angle of the shutter mechanism in accordance with a displacement of the actuating member in the other direction, wherein the improvement comprises a shutter biasing means for biasing the shutter mechanism in a direction to open or close the photographing aperture, so that one of the opening and closing operations of the shutter mechanism is effected by the biasing means, the other closing or opening operation being effected by the movement of the actuating member which is in turn moved by the reversible motor.

Preferably, the shutter biasing means continuously biases the shutter mechanism to close the same.

In this case, the biasing force of the biasing means increases in accordance with the movement of the actuating member in the other direction.

According to another aspect of the present invention, the apparatus further comprises a shutter holding mechanism which maintains the shutter mechanism in a closed position against the shutter biasing means, and a trigger means for releasing the maintenance of the shutter mechanism in the closed position by the shutter holding mechanism when the actuating member is moved by a predetermined displacement corresponding to an object luminance.

If the shutter biasing means continuously biases the shutter mechanism to open the same, an electromagnetic holding mechanism which holds the shutter mechanism in a closed position against the shutter biasing means is additionally provided.

According to still another aspect of the present invention, there is provided a shutter control apparatus of a camera comprising an actuating member which is driven by a motor, a shutter mechanism which opens and closes a photographing aperture by the movement of the actuating member, and a shutter control mechanism which controls the displacement of the actuating member in accordance with an object luminance, wherein the improvement comprises a shutter biasing means for biasing the shutter mechanism in a direction to open or close the photographing aperture, so that one of the opening and closing operations of the shutter mechanism is effected by the biasing means, the other closing or opening operation being effected by the movement of the actuating member which is in turn moved by the reversible motor.

BRIEF DESCRIPTION OF THE DRAWINGS

The invention will be described below in detail with reference to the accompanying drawings, in which:

FIGS. 1 through 6 shows a first embodiment of a focus and shutter control apparatus in a camera of the present invention, of which;

FIGS. 7 through 11 show a second embodiment of the present invention, of which;

DESCRIPTION OF PREFERRED EMBODIMENTS

FIGS. 1 through 6 show a first embodiment of the present invention, in which a shutter biasing means continuously biases a shutter mechanism to close the same. Namely, in this embodiment, the shutter is opened by an actuating member which is moved by a motor and is closed by a spring. In the first embodiment, since the shutter is closed by the spring force, a high speed shutter is realized. In addition, in this embodiment, since the opening operation of the shutter by the motor is effected slower than the closing operation thereof by the spring, it is possible to relatively precisely control the aperture of the shutter (largest aperture).

Figure 1:
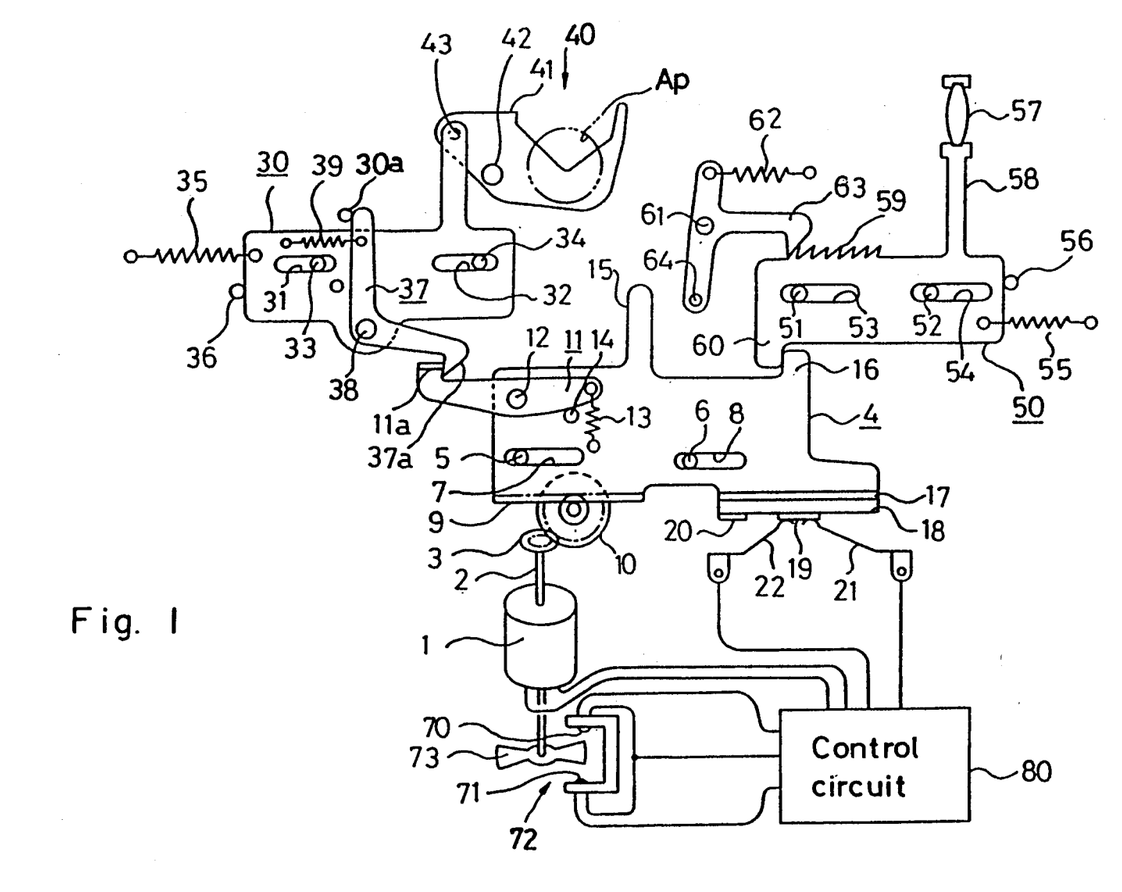
FIG. 1 is a schematic front elevational view before the operation of the apparatus starts.
Figure 2:
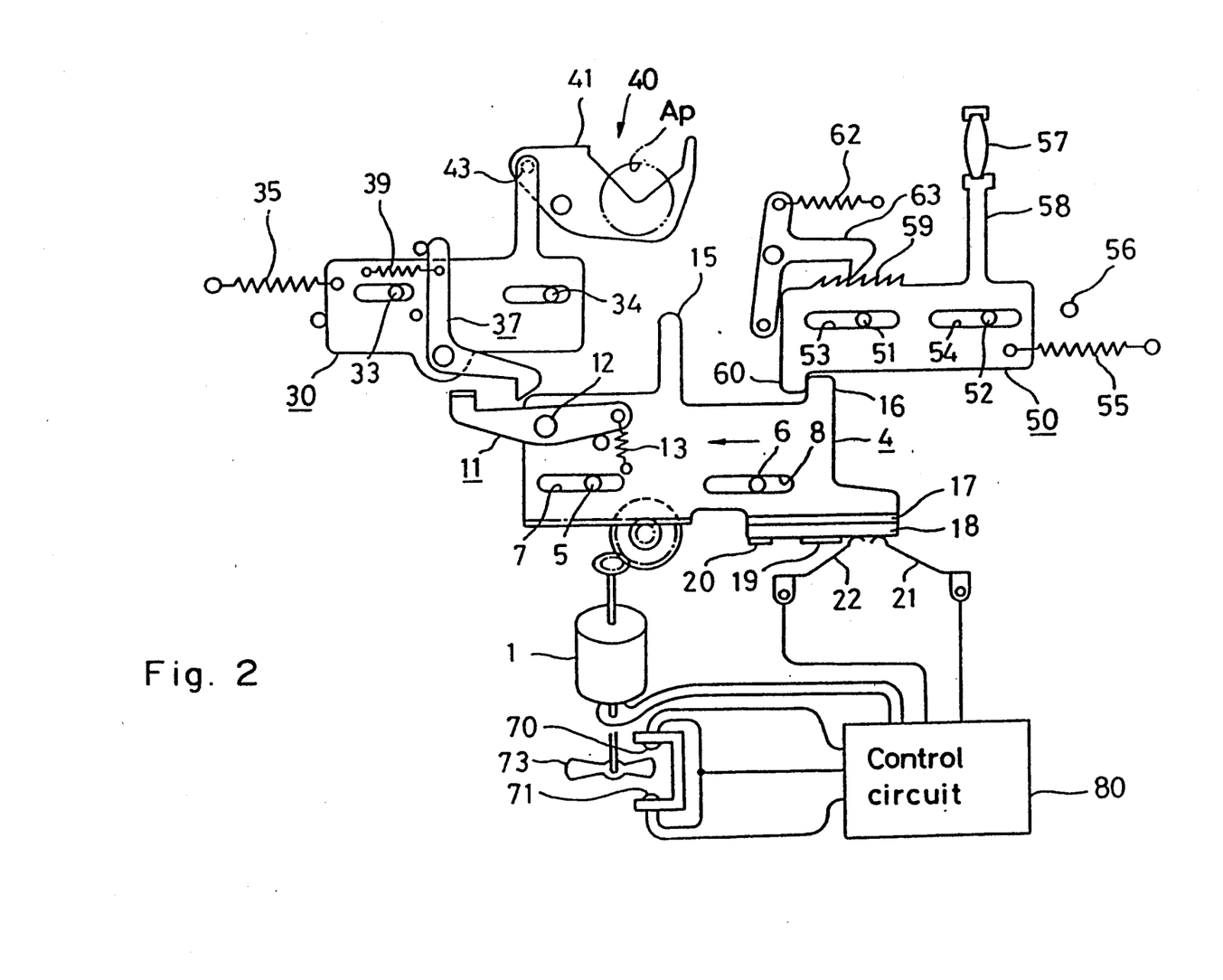
FIG. 2 is a view similar to FIG. 1, when a motor rotates in the clockwise direction.
Figure 3:
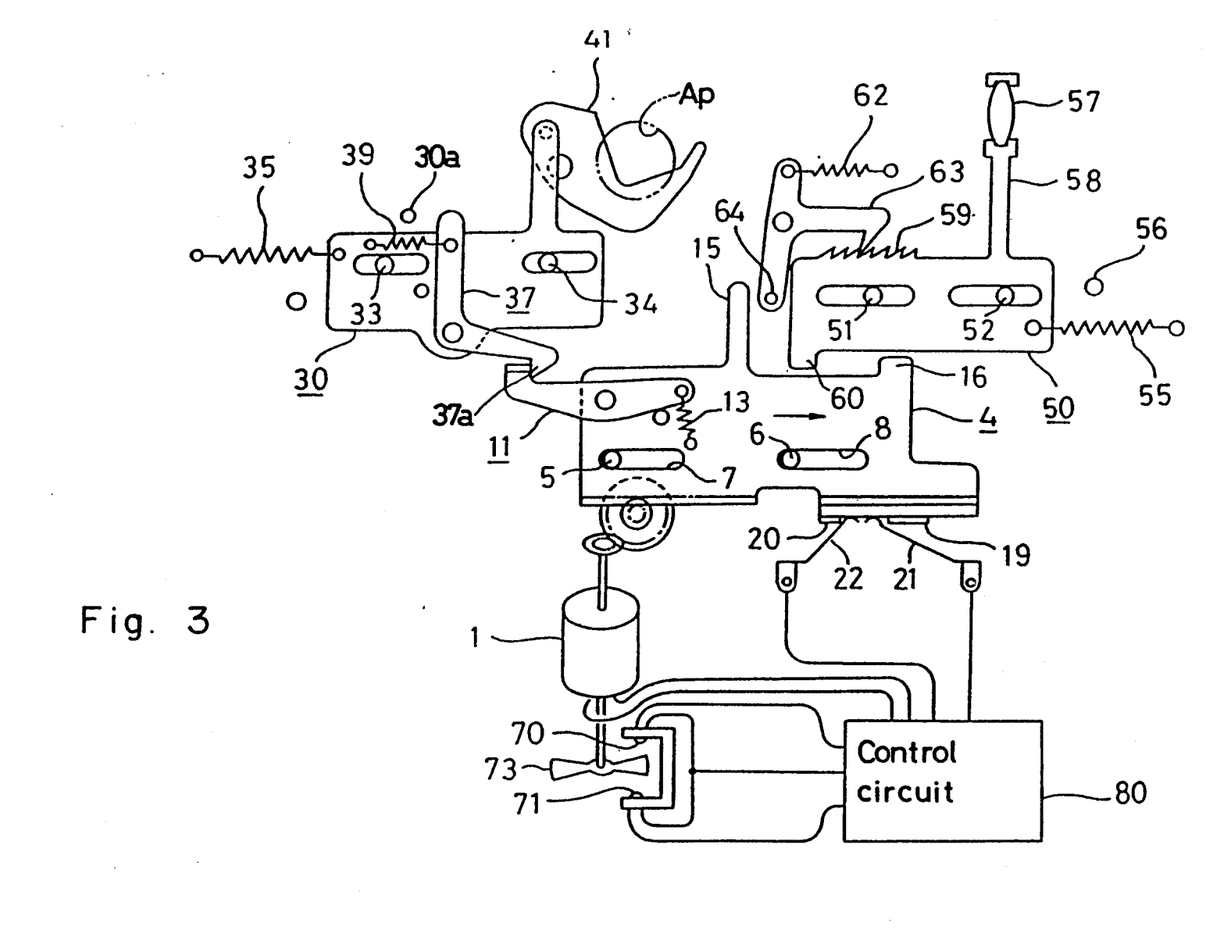
FIG. 3 is a view similar to FIG. 1, when a motor rotates in the counterclockwise direction.

In FIGS. 1 through 3, a reversible motor 1 which is secured to a shutter base plate (not shown) has an output shaft 2 having a pinion 3 secured thereto. An actuating member 4 which has elongated holes 7 and 8 extending in the right and left hand directions in FIG. 1 is located on the shutter base plate. In the elongated holes 7 and 8 are fitted corresponding pins 5 and 6 which are secured to the shutter base plate, so that the actuating member 4 can move in the direction of the length of the elongated holes 7 and 8, i.e. in the right and left hand directions in FIG. 1.

The actuating member 4 is provided on its lower edge with a rack 9 which is engaged by a double gear 10 which is in turn engaged by the pinion 3, so that the rotation of the motor 1 is transmitted to the actuating member 4 through the pinion 3, the double gear 10 and the rack 9. As a result, the actuating member 4 is moved in the right or left hand direction in FIG. 1, in accordance with the direction of the rotation of motor 1.

On the upper left end of the actuating member 4 engaging member 11 is provided which is rotatably supported on a shaft 12 and which is continuously biased in the clockwise direction in FIG. 1 by a coil spring 13 provided between the actuating member 4 and the engaging member 11. The rotational displacement of the engaging member 4 in the clockwise direction is restricted by a stop pin 14 provided on the actuating member 4.

On the upper edge of the actuating member 4 are provided a long projection 15 at the center of the actuating member 4 and a short projection 16 at the right end thereof. The actuating member 4 is provided on its right lower edge with a bent end 17 which is bent to extend perpendicularly to the plane of the actuating member 4 (i.e. perpendicular to the sheet of the drawing of FIG. 1) and which has a switch plate 18 secured to the lower face thereof.

Electrical conductors 19 and 20 are provided on the lower surface of the switch plate 18 which is made of an electrical insulation material. The conductors 19 and 20 are electrically insulated from the shutter base plate. In FIG. 1, two terminal contacts 21 and 22 are both electrically connected to the conductor 19. The conductors 19 and 20 and the terminal contacts 21 and 22 form a detecting means for detecting the position of the actuating member 4.

On the shutter base plate an automatic exposure drive member 30 is provided which has elongated holes 31 and 32 in which guide pins 33 and 34 provided on the shutter base plate are fitted, so that the automatic exposure drive member 30 can be moved in the right and left hand directions in FIG. 1, similar to the actuating member 4. The automatic exposure drive member 30 is biased in the left hand direction by a coil spring 35 provided between the automatic exposure drive member 30 and the shutter base plate. The displacement of the automatic exposure drive member 30 is restricted by a stop pin 36 provided on the shutter base plate.

A generally L-shaped clutch lever 37 is rotatably supported on the automatic exposure drive member 30 through a shaft 38. The clutch lever 37 is biased in the counterclockwise direction by a coil spring 39 provided on the automatic exposure drive member 30. The rotation of the clutch lever 37 in the counterclockwise direction is restricted by a stop pin 30a provided on the shutter base plate.

A shutter mechanism 40 has a sector 41 which is composed of two blades to open and close a lens aperture Ap. For clarification, only one blade of the sector 41 is shown in FIG. 1. The sector 41 is rotatably attached to the shutter base plate by a pivot shaft 42. The sector 41 has an elongated hole (not shown) in which a sector drive pin 43, provided on the automatic exposure drive member 30, is fitted.

The automatic exposure drive member 30, the guide pins 33 and 34, the coil spring 35, the stop pin 36, and the sector 41 etc. constitute an automatic exposure control system (shutter control mechanism). The clutch lever 37 corresponds to the clutch member.

On the shutter base plate is provided an automatic focus drive member 50 which has elongated holes 53 and 54 in which guide pins 51 and 52, provided on the shutter base plate, are fitted, so that the automatic focus drive member 50 can be moved in the right and left hand directions in FIG. 1, similar to the actuating member 4 and the automatic exposure drive member 30. The automatic focus drive member 50 is biased in the right hand direction by a coil spring 55. The displacement of the automatic focus drive member 50 in the right hand direction is restricted by a stop pin 56 provided on the shutter base plate.

The automatic focus drive member 50 has a lens holder 58 which holds a photographing lens 57, ratchet teeth 59 and a projection 60 which is engaged by the projection 16 provided on the actuating member 4. The ratchet teeth 59 are engaged by a pawl 63 which is rotatably supported on the shutter base plate by a shaft 61 and which is continuously biased by a coil spring 62 in the clockwise direction.

The automatic focus drive member 50, the guide pins 51 and 52, the coil spring 55, the stop pin 56, and the lens holder 58 etc. form an automatic focus control system (automatic focus adjusting mechanism). The ratchet teeth 59 and the pawl 63 constitute a retaining mechanism which maintains the automatic focus control system at a predetermined position.

A detector 72 which detects the rotational displacement of the motor 1 has a light emitter 70, a light receiver 71 which is opposed to the light emitter 70, and a light interrupter 73 which is mounted to the drive shaft 2 of the motor 1 to periodically interrupt light of the light emitter 70.

A control circuit 80 is electrically connected to the motor 1, the terminal contacts 21 and 22, the light emitter 70, and the light receiver 71, respectively. An AF object distance measuring circuit of an AF object distance measuring device, an AE photometering circuit of an AE photometer and a power source are also connected to the control circuit 80.

Figure 4:
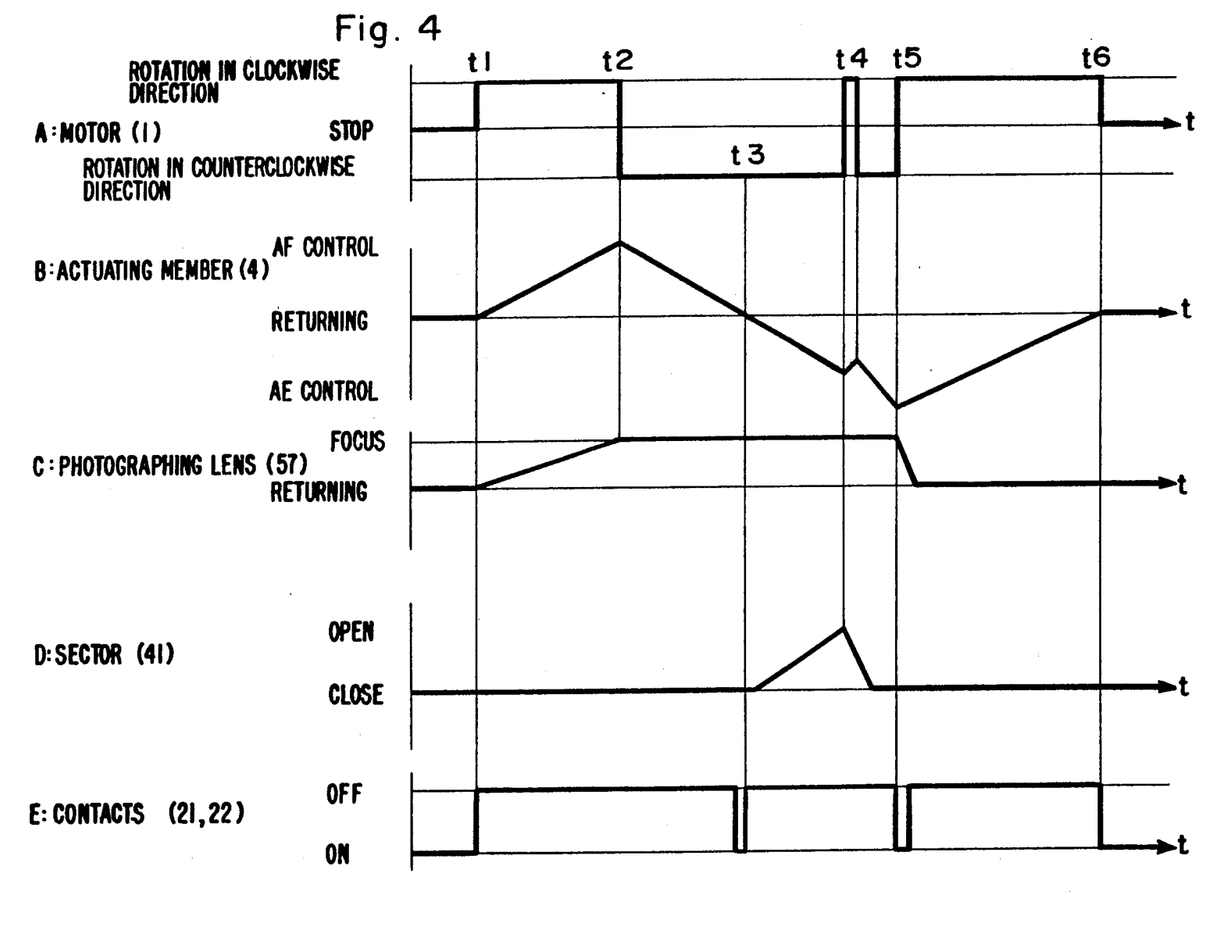
FIG. 4 is a time chart showing operations of the apparatus shown in FIG. 1.

The apparatus shown in FIGS. 1 through 3 operates as follows (see also FIG. 4).

When the release button (not shown) of a camera is pushed down, the AF object distance measuring and the AE photometering are effected. Thereafter, the motor 1 rotates in the clockwise direction, at time t1 in FIG. 4(A). As a result, the actuating member 4 begins moving in the left hand direction, as shown in FIG. 2.

The movement of the actuating member 4 in the left hand direction causes the conductor 19 to move in the same direction, so that the conductor 19 is disconnected from the terminal contacts 21 and 22. Consequently, the electrical connection between the terminal contacts 21 and 22 is broken. The control circuit 80 detects the breakage of the electrical connection and counts the number of pulses output from the light receiver 71 to detect the number of revolution of the motor 1, to thereby detect the displacement of the actuating member 4 in the left hand direction. The left displacement of the actuating member 4 causes the projection 16 to come into contact with the projection 60, so that the automatic focus drive member 50 is moved in the left hand direction against the coil spring 55, whereby the photographing lens 57 is moved in the left hand direction. Accordingly, the position in which the projections 16 and 60 come into abutment with each other corresponds to a beginning position of the automatic focus control zone.

On the other hand, no change in position of the automatic exposure drive member 30 occurs, since the engaging member 11 moves away from the clutch lever 37, as shown in FIG. 2. Accordingly, no change in position of the sector 41 of the shutter mechanism 40 occurs. Namely, the lens aperture Ap is maintained in a closed position.

When the photographing lens 57 (automatic focus drive member 50) is moved to a predetermined position (terminal end position of the automatic focus control zone) corresponding to an object distance which is detected by the AF object distance measuring device, the control circuit 80 receives the focus signal to send a signal to rotate the motor 1 in the reverse direction (counterclockwise direction). This state corresponds to time t2 in FIG. 4(A).

When the motor 1 rotates in the counterclockwise direction, the actuating member 4 moves in the right hand direction in FIG. 2. The automatic focus drive member 50 does not move and is kept still in a position shown in FIG. 2, since the pawl 63 is engaged by the ratchet teeth 59. Accordingly, the photographing lens 57 is kept still in the focus position, as shown in FIG. 4(C).

When the actuating member 4 moves further in the right hand direction, it passes the initial position shown in FIG. 1. This corresponds to time t3 shown in FIG. 4(E). At time t3, the terminal contacts 21 and 22 are instantaneously turned ON and are turned OFF again immediately thereafter, as shown in FIG. 4(E). The switching signal of the ON and OFF operations is used as a trigger signal which is sent to the control circuit 80 to begin counting the signals output from the light receiver 71.

At time t3, the engaging member 11 engages with the clutch lever 37 (start position of the automatic exposure control zone). A further movement of the actuating member 4 in the right hand direction causes the automatic exposure drive member 30 to move in the right hand direction against the coil spring 35. In this state, the upper end of the clutch lever 37 is disengaged from the stop pin 30a, and accordingly, the coil spring 39 tends to rotate the clutch lever 37 to disengage from the engaging member 11. However, no disengagement of the vertical projection 11a of the engaging member 11 from a pawl 37a of the clutch lever 37 takes place during the movement of the actuating member 4 in the right hand direction. The frictional engagement force is determined so as to perform the operations mentioned above.

When the automatic exposure drive member 30 begins moving in the right hand direction, the sector 41 of the shutter mechanism 40 begins rotating in the clockwise direction. As a result, when the automatic exposure drive member 30 is moved in the right hand direction to the terminal end position of the automatic exposure control area by a displacement which is determined by the arithmetic operation of the AE photometering circuit and the number of pulses output from the light receiver 71, the motor 1 which is rotating in the counterclockwise direction is instantaneously reversed in the clockwise direction. This corresponds to time t4 shown in FIG. 4.

At the same time, the engaging member 11 is disengaged from the clutch lever 37 by the coil spring 39, so that the automatic exposure drive member 30 is quickly returned to the initial position shown in FIG. 1 by the coil spring 35. Consequently, the sector 41 quickly rotates in the counterclockwise direction to be closed, so that the shutter mechanism 40 is closed by the spring force. Note that instead of the temporary rotation of the motor in the clockwise direction (right hand direction), as mentioned above, it is possible to temporarily stop the motor 1 in order to disengage the engaging member 11 from the clutch lever 37.

Thereafter, the motor 1 begins rotating again in the counterclockwise direction (left hand direction). In this case, no rotational displacement (number of revolution) of the motor 1 can be precisely counted because of the restart of the operation. Consequently, the motor 1 continues rotating in the counterclockwise direction, regardless of the pulses sent from the light receiver 71.

A further movement of the actuating member 4 causes the terminal contacts 21 and 22 to come into contact with the conductor portion 20, so that an electrical connection between the contacts is established. This corresponds to time t5 shown in FIG. 4(E).

As a result, the projection 15 of the actuating member 4 bears against the pin 64 of the pawl 63 to rotate the pawl 63 in the coil spring 62 against the coil spring 62, thereby to disengage the pawl 63 from the ratchet teeth 59. Consequently, the automatic focus drive member 50 is moved in the right hand direction by the coil spring 55 to return the photographing lens 57 to the initial position shown in FIG. 1.

When the contacts 21 and 22 are electrically connected to each other, the motor 1 begins rotating in the clockwise direction in accordance with the control signal of the control circuit 80, so that the actuating member 4 commences to move in the left hand direction. In this operation, no detection of the position of the actuating member 4 is effected by the detector which detects the number of revolution of the motor 1.

Prior to return to the initial position shown in FIG. 1, the bent end 11a of the engaging member 11 perpendicular to the plane of the engaging member 11 comes into abutment with the oblique portion 37a of the lower end of the clutch lever 37. Thereafter, the engaging member 11 rotates in the counterclockwise direction against the coil spring 13, so that the bent end 11a engages with the pawl 37a of the clutch lever 37 at the initial position. Thus the actuating member 4 is returned to the initial position, the contacts 21 and 22 are electrically connected to each other through the conductor portion 19. This corresponds to time t6 shown in FIG. 4(E).

As soon as the terminal contacts 21 and 22 are electrically connected to each other, the motor 21 is stopped. Thus, a series of automatic focusing operations and a series of automatic exposure operations are finished, and the control proceeds to a position ready for a subsequent operation.

The following discussion will be directed to a long exposure operation in which the sector 41 is fully opened for a predetermined period of time.

Figure 5:
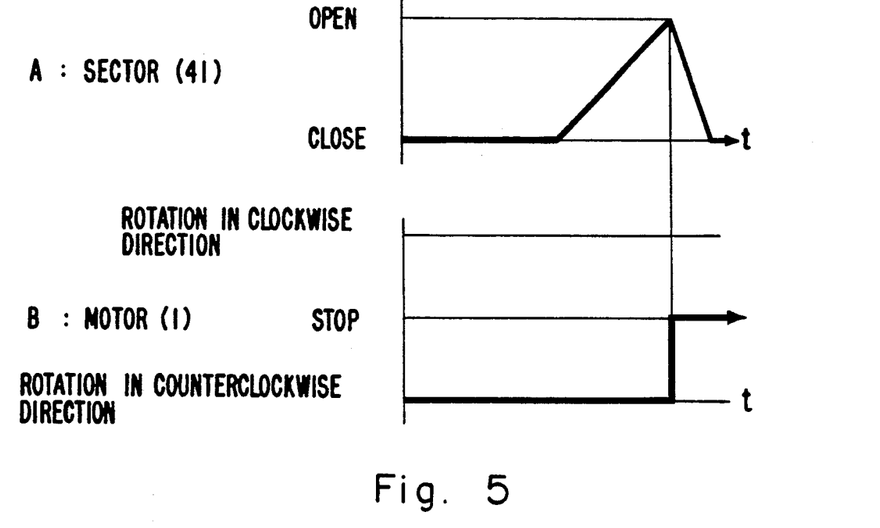
FIG. 5 is a time chart for explaining the operations when the motor is quickly stopped.

In theory, the long exposure can be carried out by stopping the motor 1 at a full open position of the sector 41. However, when the motor 1 is quickly stopped, the engaging member 11 is disengaged from the clutch lever 37, so that the sector 41 can not be maintained in the open position and may be quickly closed, as shown in FIG. 5.

To avoid this, the motor 1 is controlled as follows.

Figure 6:
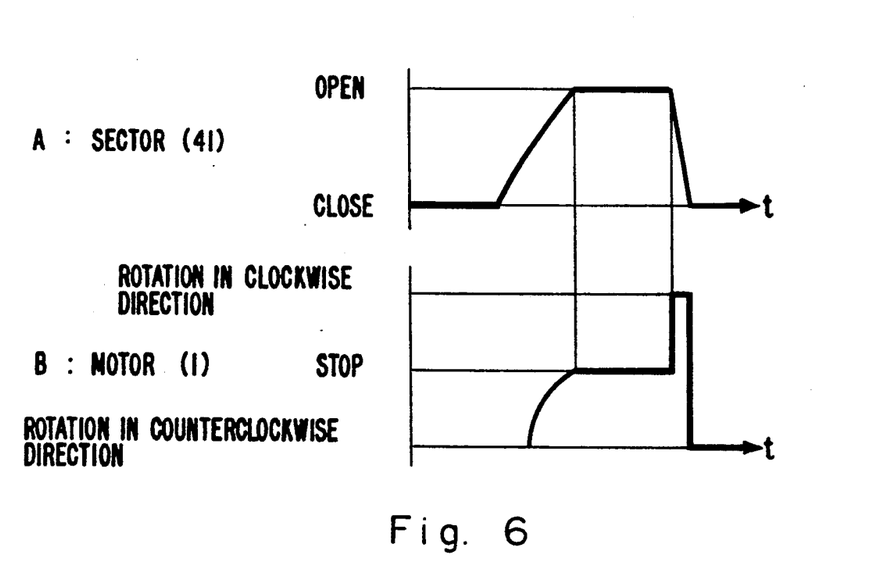
FIG. 6 is a time chart for explaining the operations when the motor is slowly stopped.

In case where the sector 41 continues to open for a long period of time, the control circuit 80 which detects the long opening of the sector 41 controls the motor 41, so that the rotational speed of the motor 1 is reduced immediately before the sector 41 is fully opened, as shown in FIG. 6. As a result, the engaging member 11 is prevented from being disengaged from the clutch lever 37. After the lapse of a predetermined time, the control circuit 80 sends a pulse signal to the motor 1 to rotate the same in the clockwise direction, so that the engaging member 11 is disengaged from the clutch lever 37. Consequently, the automatic exposure drive member 30 is rapidly moved in the left hand direction by the spring force of the tensile spring 35 to close the shutter.

The lens and shutter drive apparatus of the present invention can be variously modified as follows.

For example, the actuating member 4, the automatic exposure drive member 30, the automatic focus drive member 50 can be concentrically arranged to surround the optical axis of the photographing lens 57.

It is possible to use a stepping motor as the motor 1 which is controlled by the control circuit 80, in place of the detector comprised of the light emitter 70 etc. to detect the rotational displacement of the motor 1.

It is possible to process the ON and OFF signals of the terminal contacts 21 and 22 in the reverse way to the process thereof mentioned above.

Finally, it is also possible to stop the sector 41 at a desired intermediate opening position between the full open position and the closed position, taking the diaphragm priority into account.

As can be seen from the foregoing, according to the embodiments of the present invention mentioned above in which the sector 41 is opened by the motor, since the sector 41 is quickly closed, regardless of the rotational speed (number of revolution) of the motor 1, a high speed shutter can be realized. Furthermore, since the actuating member which is moved between the automatic focus control area and the automatic exposure control area by the drive of the motor 1 releases the focused state set by the automatic focus control system after the completion of the exposure operation, the lens and shutter drive apparatus which can stably and reliably effect the above-mentioned engaging and disengaging operations can be simplified.

FIGS. 7 through 11 show a different embodiment of the present invention in which the shutter biasing means continuously biases the shutter mechanism to open the same. Namely, in this embodiment, the shutter is opened by the spring force and is closed by the movement of the actuating member which is in turn actuated by the motor. According to this embodiment, since the opening of the shutter is carried out by the spring force, not only a high speed shutter can be realized, but also a long exposure can be easily performed for example by stopping the motor, because the closing of the shutter is effected by the motor.

In the embodiment illustrated in FIGS. 7 through 11, the automatic focus is effected by the movement of the actuating member 4A in the right hand direction and the automatic exposure is effected by the movement of the actuating member 4A in the left hand direction, unlike the first embodiment shown in FIGS. 1 through 6. Furthermore, the embodiment illustrated in FIGS. 7 through 11 is different in the construction of the switch mechanism for detecting the position of the actuating member 4A from the first embodiment.

The actuating member 4A, the supporting mechanism of the automatic focus drive member 50A, the drive mechanism of the actuating member 4A, the shutter mechanism 40, and the detector 72 of the rotational displacement of the reversible motor 1 are substantially same as those of the first embodiment. In FIGS. 7 through 11, the components corresponding to those in the first embodiment are designated with the same reference numerals.

The automatic focus drive member 50A is continuously biased by the coil spring 55A in the left hand direction, contrary to the first embodiment, so that the automatic focus drive member 50A bears at the left end edge 50a thereof against the right bent end 4a of the actuating member 4A. The movement of the automatic focus drive member 50A in the right hand direction is restricted by the stop pin 56A.

The ratchet teeth 59 formed on the lower edge of the automatic focus drive member 50A are engaged by the engaging end of the engaging lever 63A which is pivoted to the shutter base plate through the shaft 61A. The engaging lever 63A is biased to rotate in the counterclockwise direction to engage with the ratchet teeth 59.

The actuating member 4A has an extension arm 4b which is provided on its front end with a releasing pin 64A which comes into engagement with the engaging lever 63A when the actuating member 4A moves in the left hand direction by a predetermined displacement to release the engagement thereof with the automatic focus drive member 50A.

The automatic exposure drive member 30A which drives the shutter mechanism 40 is in the form of a crank lever which is rotatably supported by the shutter base plate through the shaft 113. The automatic exposure drive member 30A is provided on its arms with a pin 43A and a follower pin 115 provided thereon, so that the pin 43A is fitted in the elongated hole 41a formed in the sector 41. The automatic exposure drive member 30A is biased by the tensile spring 114 in a direction in which the sector 41 is opened.

Against the tensile spring 114, the automatic exposure drive member 30A is maintained in a closed position in which the sector is closed by a magnet 81. The magnet 81, when energized, attracts an armature 117 which is provided on the automatic exposure drive member 30A to maintain the sector 41 in the closed position against the tensile spring 114. The supply of the electrical power to the magnet 81 is controlled by the control circuit 80.

On the upper edge of the actuating member 4A are provided an exposure setting cam portion 116 which is engaged by the follower pin 115 of the automatic exposure drive member 30A and a switch cam portion 131. The cam portion 116 has an oblique cam surface which comes into engagement with the follower pin 115 to determine the sector angle. Consequently, the sector angle is determined by the time at which the follower pin 115 engages with the cam portion 116 during the movement of the actuating member 4A within the automatic exposure control area. The upper end of the cam portion 116 is connected to a horizontal edge 116a to keep the sector in the closed position.

The switch 123 which detects the position of the actuating member 4A is actuated by the switch cam portion 131 of the actuating member 4A through a switch lever 127.

In a coil portion 123a of the switch 123 made of a torsion spring, is loosely inserted an insulation pin 124 provided on the shutter base plate above the left end of the actuating member 4A. The movable contacts 123b and 123c of the switch 123 are located at the two bottom apexes of an imaginary triangle defined by the movable contacts and the insulation pin 124 which is located at the remaining apex of the triangle.

The movable contacts 123b and 123c are elastically engaged by contact pins 125 and 126 provided on the shutter base plate, respectively. The contact pins 125 and 126 are electrically connected to the control circuit 80.

The switch lever 127 is pivoted to the shutter base plate through a pin 128 and is biased to rotate in the clockwise direction by the coil spring 129.

An insulation pin 130 provided on the switch lever 127 at one end thereof is pressed against the switch cam portion 131 which is formed on the upper edge of the actuating member 4A by the coil spring 129. The switch lever 127 is provided on its opposite end with an insulation pin 132 to separate the movable contact 123c from the contact pin 126.

The lower end of the switch cam portion 131 is connected to the horizontal edge portion 116a which maintains the insulation pin 132 separate from the movable contact 123c. The upper end of the switch cam portion 131 is connected to the horizontal edge 131a which causes the insulation pin 132 to engage with the movable contact 123c to maintain the latter separate from the contact pin 126.

The apparatus of the invention operates as follows (particularly see FIGS. 7 through 10).

Figure 7:
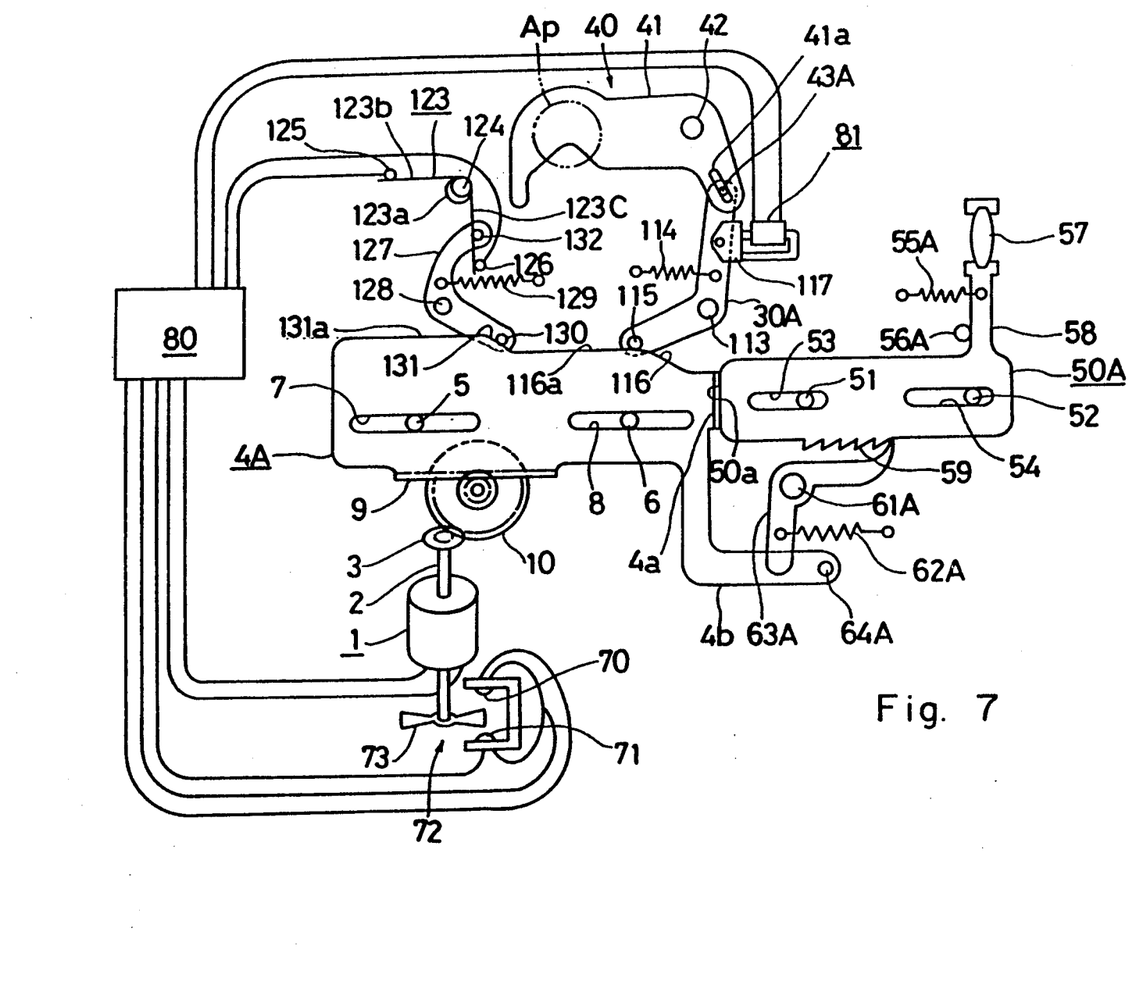
FIG. 7 is a schematic front elevational view before the operation of the apparatus starts.

When the release button (not shown) of a camera is pushed down in a position shown in FIG. 7, the AF object distance measuring and the AE photometering can be effected. A command signal is supplied from the control circuit 80 to the reversible motor 1, in accordance with the detection signals to rotate the motor 1 in the counterclockwise direction.

Figure 8:
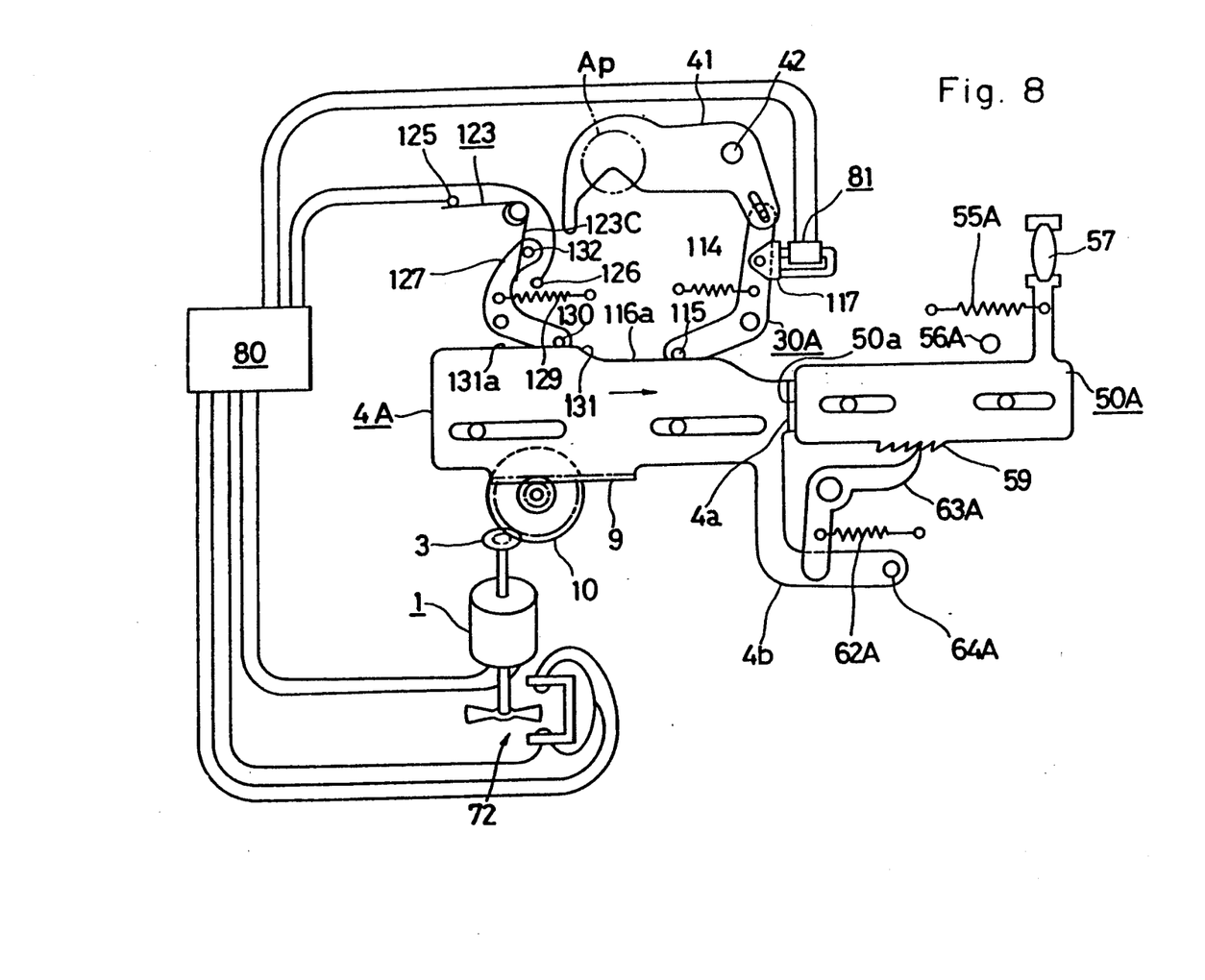
FIG. 8 is a view similar to FIG. 7, when a motor rotates in the clockwise direction.
Figure 10:
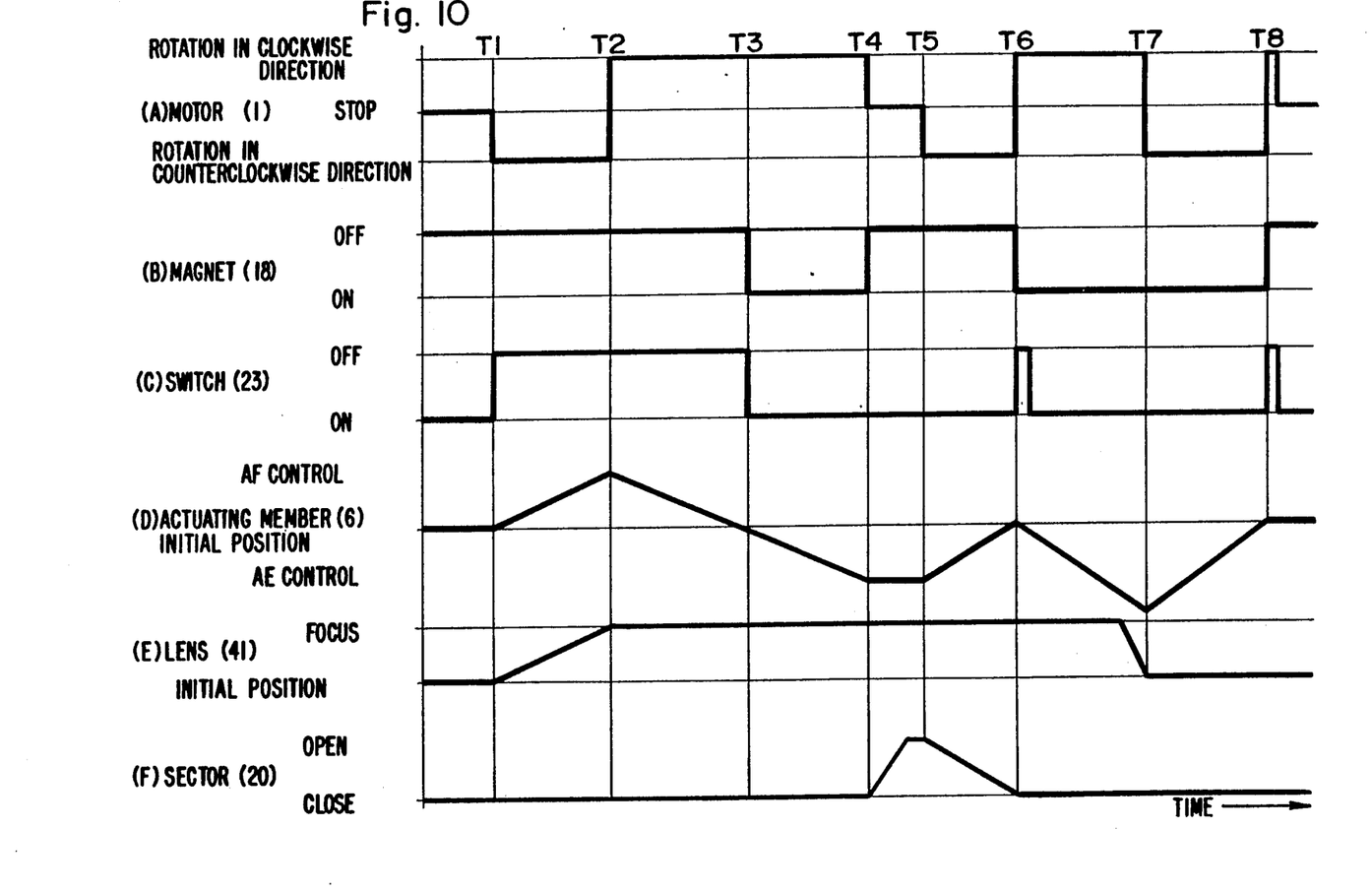
FIG. 10 is a time chart showing operations of the apparatus shown in FIG. 7; and, FIG. 11 is a time chart showing different operations of the apparatus shown in FIG. 7.

When the motor 1 rotates in the counterclockwise direction, the actuating member 4A begins moving in the right direction in FIG. 8. This corresponds to time T1 in FIG. 10(A).

When the actuating member 4A moves right in FIG. 8, the switch cam portion 131 pushes the pin 130, and accordingly, the switch lever 127 rotates in the counterclockwise direction. As a result, the insulation pin 132 pushes the movable contact 123c of the switch 123, so that the movable contact 123c separates from the associated contact pin 126 to make the switch 123 OFF. This corresponds to time T1 in FIG. 10(C).

When the OFF signal of the switch 123 is fetched in the control circuit 80, the control circuit 80 counts the number of pulses generated by the light receiver 71 of the rotational displacement detector 72 of the motor 1. The displacement of the actuating member 4A in the right direction is arithmetically determined by the counted number of pulses.

When the actuating member 4A moves right, the bent end 4a thereof pushes the left edge 50a of the automatic focus drive member 50A, so that the automatic focus drive member 50A moves in the same direction against the coil spring 55A. Since the follower pin 115 of the automatic exposure drive member 30A engages with the horizontal edge portion 116a of the actuating member 4A, the automatic exposure drive member 30A does not move, and accordingly, the sector 40 maintains the lens aperture Ap in the closed position.

When the actuating member 4A moves right to move the photographing lens 57 in the same direction by a displacement corresponding to the detected focal length (the object distance). Consequently, the control circuit 80 commands the motor 1 to rotate in the reverse direction (clockwise direction).

The rotation of the motor 1 in the clockwise direction causes the actuating member 4A to move left from a position shown in FIG. 7. However, since the ratchet teeth 59 are engaged by the engaging lever 63A, the automatic focus drive member 50A does not move, so that the automatically set position of the lens 57 is maintained, as shown in FIG. 10(E).

When the actuating member 4A comes to the initial position shown in FIG. 7 the pin 130 of the switch lever 127 moves from the horizontal edge portion 131a of the actuating member 4A to the switch cam portion 131. As a result, the lever 127 rotates in the clockwise direction, so that the insulation pin 132 separates from the movable contact 123c of the switch 123. Consequently, the switch 123 is made ON. This corresponds to time T3 in FIG. 10(C).

The ON signal of the switch 123 is fetched in the control circuit 80, so that the latter counts again the number of pulses generated from the light receiver 71 of the detector 72 to arithmetically operate the displacement of the actuating member 4A in the left direction from the initial position. Thus, the actuating member 4A is moved to the automatic exposure control area.

The control circuit 80 which receives the ON signal of the switch 123 supplies the electrical power to the electromagnet 81 to energize the latter. As a result, the armature 117 is attracted by the electromagnet 81. Accordingly, even when the cam portion 116 comes to a position in which it is opposed to the follower pin 115 of the automatic exposure drive member 30A, neither the automatic exposure drive member 30A nor the sector 41 move, so that the lens aperture Ap is kept closed.

When the actuating member 4A comes to a position corresponding to the optimum exposure detected by the AE photometer, that is, when the pin 115 of the automatic exposure drive member 30A becomes opposed to the portion of the cam portion 116 that gives an optimum exposure, the control circuit 80 stops the motor 1 to stop the actuating member 4A. This corresponds to time T4 in FIG. 10.

Figure 9:
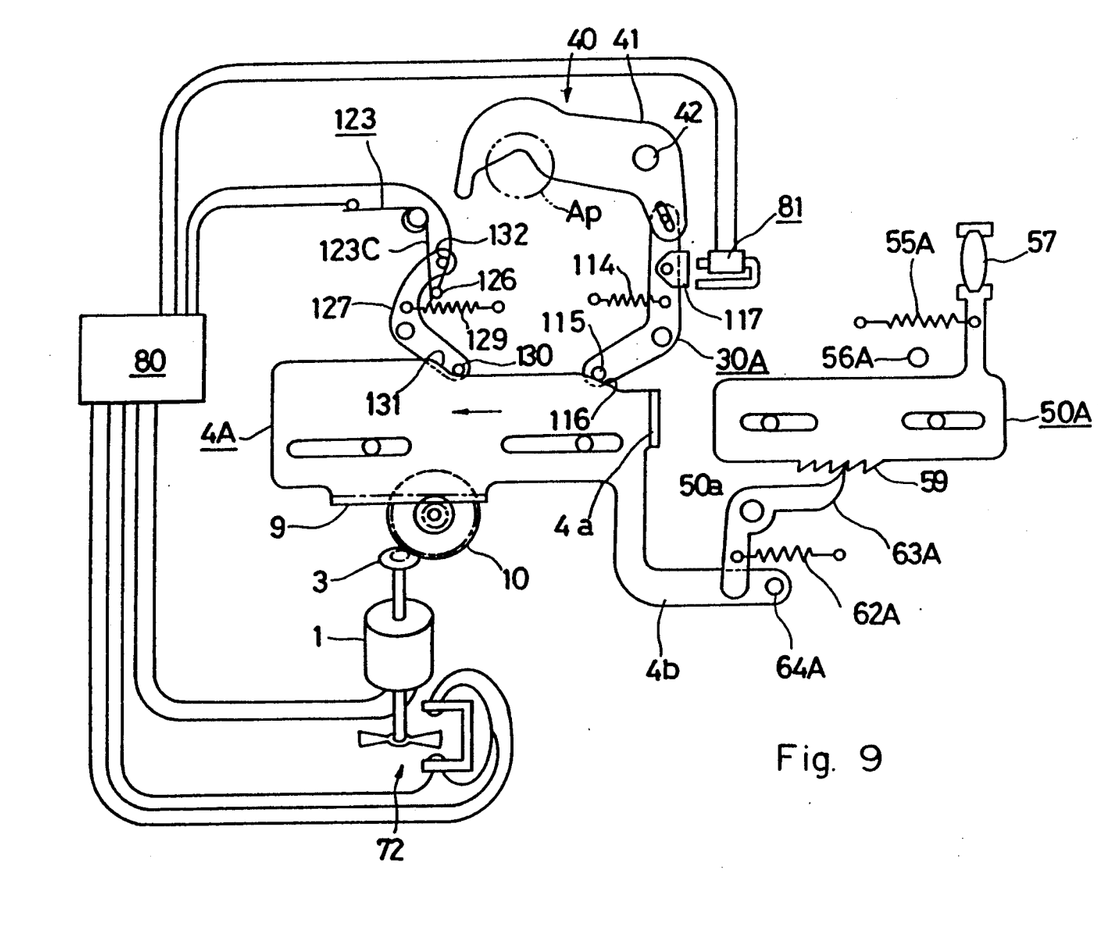
FIG. 9 is a view similar to FIG. 7, when a motor rotates in the counterclockwise direction.

As a result, no electrical power is supplied to the electromagnet 81, so that the armature 117 is released from the electromagnet 81. In this state, there is a gap between the follower pin 115 of the automatic exposure drive member 30A and the portion of the cam portion 116 mentioned above. The gap corresponds to the opening angle of the sector 41. Therefore, when the electromagnet 81 is inactivated, the automatic exposure drive member 30A is quickly rotated until the pin 115 is brought into engagement with the cam portion 116 by the spring force of the coil spring 114. At the same time, the sector 41 of the shutter mechanism 40 is quickly rotated to open the lens aperture, as shown in FIG. 9. Namely, in the second embodiment, the shutter is opened by the spring force. The wave shape of the opening movement of the sector 41 is as shown in FIG. 10(F), in which the quick movement from the closed position to the open position thereof takes place, as can be seen therefrom.

After the lapse of a predetermined exposure time, at time T5, the motor 1 which has stopped begins rotating again in the counterclockwise direction.

The rotation of the motor 1 in the counterclockwise direction causes the actuating member 4A to move right from a position shown in FIG. 9, so that the cam portion 116 pushes the follower pin 115. As a result, the automatic exposure drive member 30A is rotated in the clockwise direction, so that the sector 41 rotates in the counterclockwise direction to close the lens aperture Ap.

When the actuating member 4A comes to the initial position, the lens aperture Ap is closed by the engagement of the pin 115 and the horizontal edge portion 116a. This corresponds to time T6 in FIG. 10(F).

When the actuating member 4A passes the initial position, the insulation pin 130 comes into abutment with the switch cam portion 131 to rotate the switch lever 127, so that the insulation pin 132 of the switch lever 127 engages with the movable contact 123c of the switch 123 to temporarily turn the switch 123 OFF. This corresponds to time T6 in FIG. 10(C). The OFF signal is detected by the control circuit 80, so that the motor 1 is reversed in the clockwise direction.

Thereafter, the actuating member 4A moves left toward the automatic exposure control area, so that the insulation pin 132 separates from the movable contact 123c turning the switch 123 ON again.

In accordance with the ON signal of the switch 123, the control circuit 80 counts the number of pulses generated from the light receiver 71 to determine the displacement of the actuating member 4A in the left hand direction. At the same time, the electromagnet 81 is energized to attract the armature 117. As a result, the automatic exposure drive member 30A maintains the lens aperture Ap in the closed position.

A further movement of the actuating member 4A in the left hand direction beyond the automatic exposure control area causes the pin 64A of the extension arm 4b of the actuating member 4A to engage the engaging lever 63A to rotate the latter in the counterclockwise direction. Consequently, the engaging lever 63A which has been engaged by the ratchet teeth 59 is disengaged therefrom, so that the automatic focus drive member 50A is moved left by the spring 55A returning to the initial position in which it bears against the stop pin 56A.

After the automatic focus drive member 50A is returned to the initial position, the motor 1 is rotated in the counterclockwise direction at time T7 in FIG. 10, so that the actuating member 4A begins moving from the above-mentioned position beyond the automatic exposure control area in the right hand direction. When the actuating member 4A is returned to the initial position shown in FIG. 7, a slight movement of the actuating member 4A in the right hand direction causes the switch lever 127 to be rotated in the counterclockwise direction by the switch cam portion 131, so that the insulation pin 132 causes the movable contact 123c to separate from the contact pin 126 to turn the switch OFF. This corresponds to time T8 in FIG. 10.

The OFF signal is sent to the control circuit 80, so that the control circuit 80 rotates the motor 1 in the clockwise direction to move the actuating member 4A in the left hand direction. By a slight movement of the actuating member 4A in the left hand direction, the switch lever 127 is rotated in the clockwise direction by the switch cam portion 131, so that the insulation pin 132 separates from the movable contact 123c to turn the switch ON.

When the motor 1 is stopped, the actuating member 4A is returned to the initial position shown in FIG. 7. Simultaneously, the supply to the electromagnet 81 is stopped, so that sequential operations for a series of automatic focus control and automatic exposure control are finished.

According to the present invention, since the follower pin 115 is brought into contact with the cam portion 116 to open the sector 41 when the closed position of the sector 41 is released by the electromagnet 81, a very quick opening operation of the sector 41 can be performed to realize a high speed shutter.

Furthermore, since the opening angle of the sector 41 is determined by the displacement of the actuating member 4A having the cam portion 116, and since the actuating member 4A can be slowly, precisely and certainly moved by the motor 1, a desired exposure can be precisely obtained.

Figure 11:
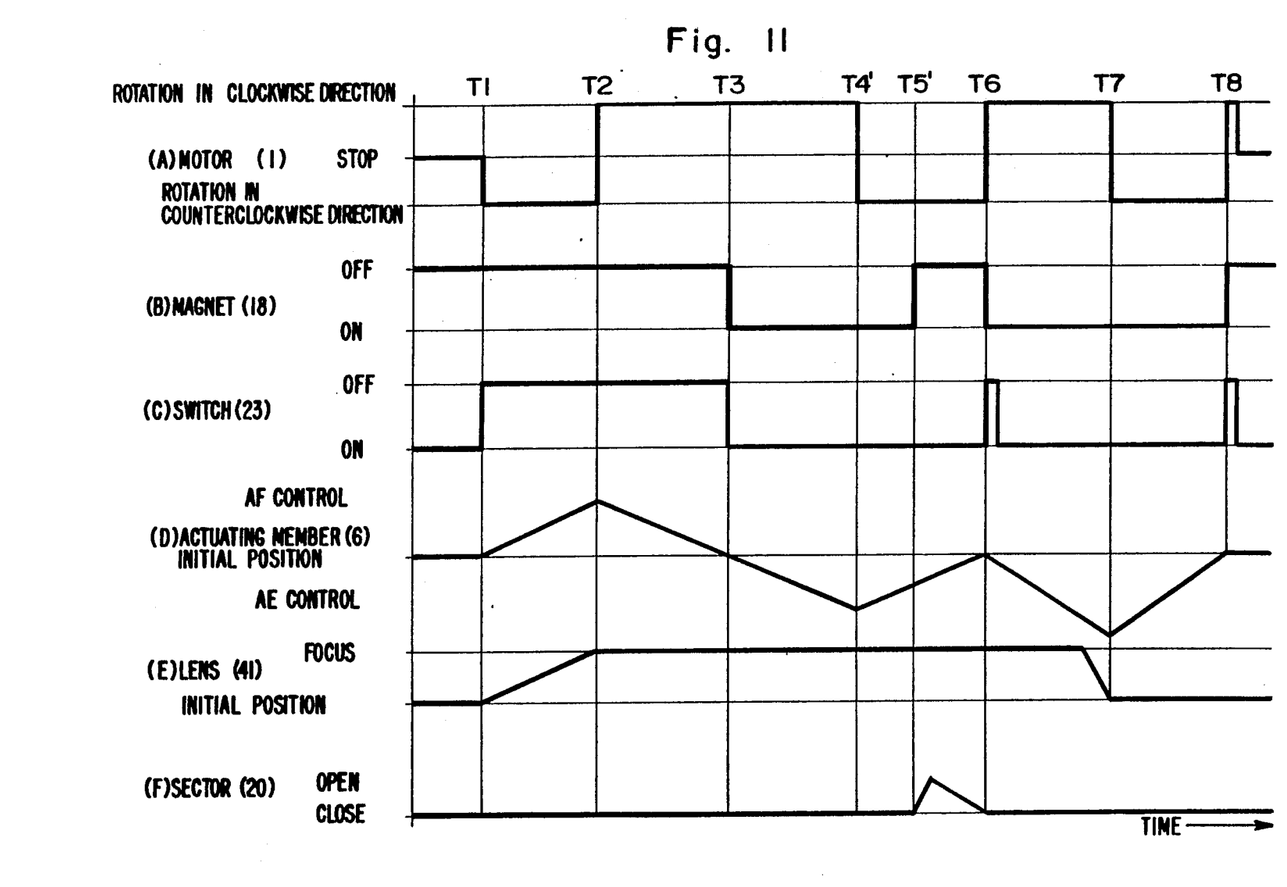

FIG. 11 shows another embodiment of the present invention.

In the embodiment illustrated in FIG. 10, the motor 1 is stopped when the follower pin 115 is opposed to the portion of the cam portion 116 that gives a desired exposure. After the lapse of a predetermined time, the motor 1 is driven again to cause the cam portion 116 to close the sector 41. Thus, a long period of exposure time can be realized, as mentioned before.

However, it takes a certain space of time (several tens of milliseconds) to restart the motor which has been stopped. This has an adverse influence on a quick closing of the shutter.

The embodiment illustrated in FIG. 11 is directed to an improvement thereof.

In FIG. 11, the operations from time T1 to time T3 and the operations after time T6 are same as those in FIG. 10.

The actuating member 4A begins moving left at time T2 and is returned to the initial position at time T3. Thereafter, the actuating member 4A moves further in the left hand direction to come to the terminal end of the automatic control exposure area. This corresponds to time T4' in FIG. 11 at which the control circuit 80 issues a command signal to the motor 1 to rotate in the counterclockwise direction at the terminal end of the automatic control exposure area, thereby moving the actuating member 4A in the right hand direction.

The displacement of the actuating member 4A is arithmetically operated from time T3 at which the switch 123 is turned ON. When the switch 123 is turned ON, the control circuit 80 supplies the electrical power to the electrogmagnet 81, so that the lens aperture Ap is maintained in the closed position by the sector 41.

When the actuating member 4A is moved by a predetermined displacement corresponding to a desired exposure detected by the AE photometer, that is, when the follower pin 115 is opposed to the portion of the cam portion 116 that gives a desired exposure, the control circuit 80 stops the supply of the electrical power to the electromagnet 81. This corresponds to time T5' in FIG. 11.

At time T5', there is a gap between the follower pin 115 and the above-mentioned portion of the cam portion 116 to determine the sector opening angle, similar to the embodiment shown in FIG. 10. When the supply to the electromagnet 81 is stopped, the pin 115 is quickly brought into contact with the cam portion 116 by the spring force of the coil spring 114 to open the shutter aperture Ap at a predetermined angle corresponding to a desired exposure.

A further movement of the actuating member 4A in the right direction causes the sector 41 to gradually close the lens aperture Ap in accordance with the profile of the cam portion 116 and completely closes the lens aperture at the initial position of the actuating member 4A. This corresponds to time T6 in FIG. 11.

When the actuating member 4A passes the initial position, the insulation pin 130 comes into engagement with the switch cam portion 131 to temporarily turn the switch 123 OFF. The OFF signal is detected by the control circuit 80, the motor 1 is rotated in the clockwise direction. The subsequent operations are same as those in FIG. 10.

According to the embodiment illustrated in FIG. 11, since the engagement of the pin 115 with the cam portion 116 is effected during the movement of the actuating member 4A in the direction to close the sector 41, the closing operation of the sector 41 can be more quickly carried out than the embodiment shown in FIG. 10, thus resulting in a higher shutter speed.

It should be appreciated that various modifications can be applied to the embodiment illustrated in FIGS. 7 through 9, similar to the aforementioned embodiment illustrated in FIGS. 1 through 3.

For example, the actuating member 4A and the automatic focus drive member 30A are concentrically arranged with respect to the optical axis of the photographing lens 57.

If a stepping motor is used as the motor 1, the detector 72 which is comprised of the light emitter 70, the light receiver 71 and the interrupter 73 can be dispensed with.

As can be understood from the foregoing, according to the embodiment illustrated in FIGS. 7 through 11, since the contact portion of the automatic exposure control system is brought into contact with the exposure setting cam portion by the spring force or the like, simultaneously with the release of the closing state of the sector by the electromagnet, so that the opening operation of the sector can be effected regardless of the number of revolution of the motor, a quick opening of the lens aperture can be realized.

Furthermore, since the sector opening angle is determined by the displacement of the actuating member having the exposure setting cam portion and since the actuating member is slowly, certainly and precisely moved, it is possible to obtain an exact largest lens aperture by the sector to obtain a desired exposure.

In addition, since the closing operation of the sector which is effected in association with the rotation of the motor does not require a high precision of the movement of the sector etc., in comparison with the opening operation thereof, a quick closing is made possible to realize a higher shutter speed.

Finally, according to the present invention, since no magnet for the automatic focusing is necessary, the apparatus can be simplified and made small and inexpensive.

I claim:
1. A focus and shutter control apparatus of a camera comprising:
   an actuating member adapted to be driven by a reversible motor;
   an automatic focus control mechanism for determining displacement of a focus adjusting lens in accordance with a displacement of said actuating member in one direction wherein said actuating member drives said focus adjusting lens;
   a shutter control mechanism for determining an opening angle of a shutter mechanism in accordance with a displacement of said actuating member in another direction; and
   means for biasing said shutter mechanism in a direction to open a photographing aperture, so that an opening movement of said shutter mechanism is effected by said biasing means, and said closing movement being effected by movement of said actuating member in response to a reversal of said reversible motor.

2. A focus and shutter control apparatus according to claim 1, wherein a biasing force of said biasing means increases in accordance with said movement of said actuating member in said another direction.

3. A focus and shutter control apparatus according to claim 1, further comprising a means for detecting a position of said actuating member.

4. A focus and shutter control apparatus according to claim 1, wherein said shutter biasing means biases said shutter mechanism to open said shutter mechanism.

5. A focus and shutter control apparatus according to claim 4, further comprising an electromagnetic holding mechanism for holding said shutter mechanism in a closed position against said shutter biasing means.

6. A focus and shutter control apparatus according to claim 5, wherein said electromagnetic holding mechanism is arranged to release said holding of said shutter mechanism when said actuating member is moved by a predetermined displacement corresponding to an object luminance.

7. A focus and shutter control apparatus according to claim 6, wherein said release of said holding of said shutter mechanism by said electromagnetic holding mechanism is effected during movement of said actuating member.

8. A shutter control apparatus of a camera comprising:
   an acutuating member which is adapted to be driven by a motor and which drives a focus adjusting lens;

a shutter mechanism adapted to open and close a photographing aperture by movement of said actuating member;

a shutter control mechanism for controlling said movement of said actuating member in accordance with an object luminance; and means for biasing said shutter mechanism in a direction to open said photographing aperture, so that said opening movement of said shutter mechanism is effected by said biasing means, and said closing movement is effected by movement of said actuating member in response to reversal of said reversible motor.

9. A shutter control apparatus according to claim 8, wherein a biasing force of said biasing means increases in accordance with said movement of said actuating member in said another direction.

10. A shutter control apparatus according to claim 8, wherein said shutter biasing means is arranged to continuously bias said shutter mechanism to open said shutter mechanism.

11. A shutter control apparatus according to claim 10, further comprising an electromagnetic holding mechanism for holding said shutter mechanism in a closed position against said shutter biasing means.

12. A shutter control apparatus according to claim 11, wherein said electromagnetic holding mechanism is arranged for releasing said holding of said shutter mechanism when said actuating member is moved by a predetermined displacement corresponding to said object luminance.

13. A shutter control apparatus according claim 12, wherein said release of the holding of said shutter mechanism by said electromagnetic holding mechanism is effected during said movement of said actuating member.

14. A shutter drive apparatus comprising an actuating member which is adapted to be moved by a motor;

an engaging member which is supported by said actuating member;

an automatic exposure drive member for actuating a sector and which is biased to close said sector; and a clutch member which is supported by said automatic exposure drive member and which can be engaged by said engaging member, said clutch member being biased to release engagement of said engaging member;

said engaging member and said clutch member being engagable with each other by movement of said actuating member by rotational movement of the motor in one direction to open said sector, so that said engagement is releasable by reverse rotation of the motor to close said sector.

15. A shutter drive apparatus according to claim 14, further comprising means for gradually reducing rotational speed of the motor as said sector opening increases and then the motor is stopped.

16. A shutter drive apparatus according to claim 15, further comprising means for reversing the motor after lapse of a predetermined time to release said engagement of said engaging member and said clutch member.

17. A shutter drive apparatus comprising an actuating member which is movable between an automatic focus control area and an automatic exposure control area by a motor;

an automatic focus control system for setting the focus by movement of said actuating member within said automatic focus control area;

an engaging mechanism for holding the automatically set focus; and an automatic exposure control mechanism for performing an automatic exposure by movement of said actuating member within said automatic exposure control area;

said actuating member being engagable by said engaging mechanism after completion of said automatic exposure to release the state of focus set by said automatic focus control system.

18. A shutter drive apparatus comprising an actuating member which is adapted to be movable by a motor;

an exposure setting cam portion which is provided on said actuating member;

an automatic exposure control system which actuates a sector and which biases said sector to open said sector;

a contact portion which is provided on said automatic exposure control system and which is movable in association with said sector to come into contact with the cam portion, said contact portion being biased to come into contact with said cam portion to open said sector;

an electromagnet for holding said automatic exposure control system in a closed position of said sector; and means for sending control signals to said electromagnet and the motor for releasing the hold by said electromagnet and for moving said actuating member with help of said cam portion for closing said sector, when said contact portion becomes opposed to a portion of said cam portion that corresponds to a desired exposure by movement of said actuating member, respectively.

19. A shutter drive apparatus according to claim 18, wherein said control means comprises means for issuing a control signal to the motor to stop movement of said actuating member when said contact portion is opposed to said portion of said cam portion that gives a desired exposure.

20. A shutter drive apparatus according to claim 19, wherein said control signal to move said actuating member in a direction to close said sector is fed to the motor from said control means after lapse of a predetermined time.

21. A shutter drive apparatus according to claim 20, wherein said control signal to release said hold of said automatic exposure control system is fed to said electromagnet from said control means during said movement of said actuating member.

22. A lens and shutter drive apparatus comprising:

an actuating member which is movable between an automatic focus control area and an automatic exposure control area by a motor;

an automatic focus control system for automatically setting focus by movement of said actuating member within said automatic focus control area;

a holding mechanism holding said automatic focus control system in a set state;

an automatic exposure control system for performing automatic exposure by movement of said actuating member within said automatic exposure control area; and an electromagnet for holding said automatic exposure control system in a zero exposure state after completion of an operation of said automatic exposure control system;

said actuating member coming into contact with said holding mechanism after the completion of said operation of said automatic exposure control system for releasing said automatic focus control system from said set state.

* * * * *

UNITED STATES PATENT AND TRADEMARK OFFICE
CERTIFICATE OF CORRECTION

PATENT NO. : 5,144,352
DATED : September 1, 1992
INVENTOR(S) : T. SHONO

It is certified that error appears in the above-indentified patent and that said Letters Patent is hereby corrected as shown below:

On the title page, item [54] and column 1, lines 2-3, change "CONTROL APPARATUS OF FOCUS AND SHUTTER OF CAMERA" to --FOCUS AND SHUTTER CONTROL APPARATUS FOR A CAMERA--.

On the title page, item [57], "ABSTRACT", line 16, change "in turn is" to --is in turn--.

Signed and Sealed this

Twenty-ninth Day of October 1996

Attest:

BRUCE LEHMAN

Attesting Officer

Commissioner of Patents and Trademarks